Dec. 20, 1966    J. L. McCAIN    3,292,905
VEHICLE REMOVAL MEANS
Filed Oct. 22, 1965    2 Sheets-Sheet 1
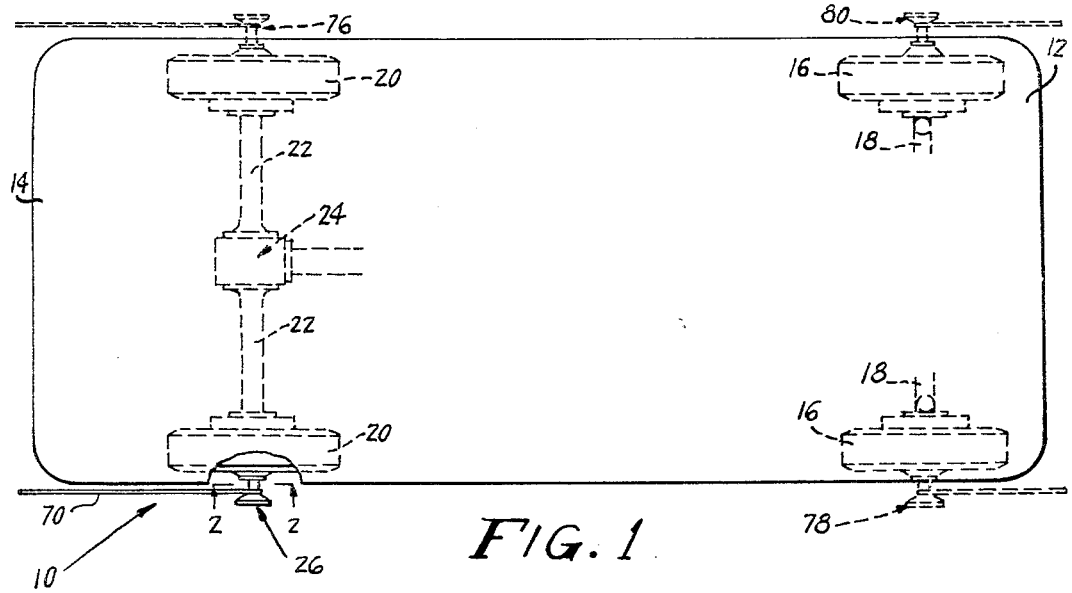
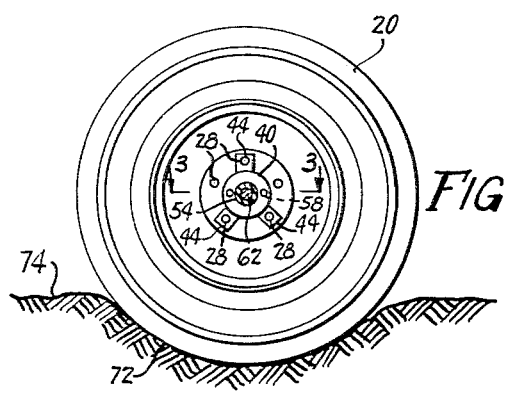
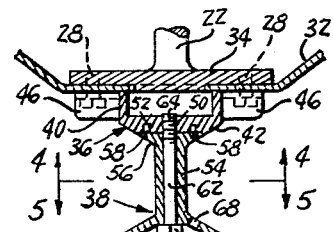
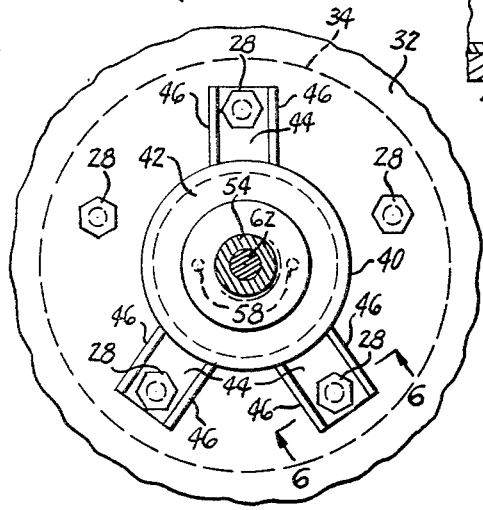
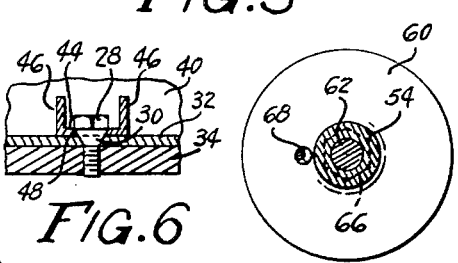
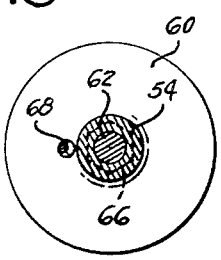
INVENTOR.
JACK L. McCAIN
BY *Kimmel & Crowell*
ATTORNEYS.

Dec. 20, 1966  J. L. McCAIN  3,292,905
VEHICLE REMOVAL MEANS
Filed Oct. 22, 1965  2 Sheets-Sheet 2
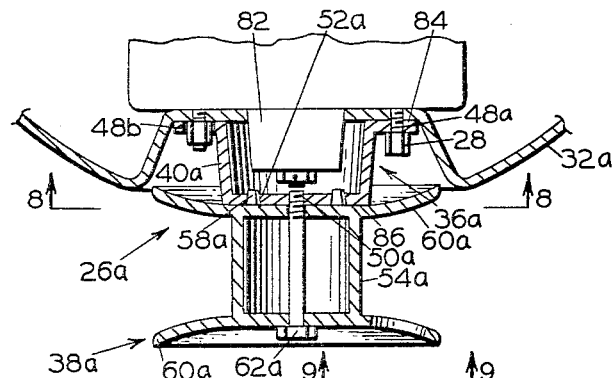
FIG. 7
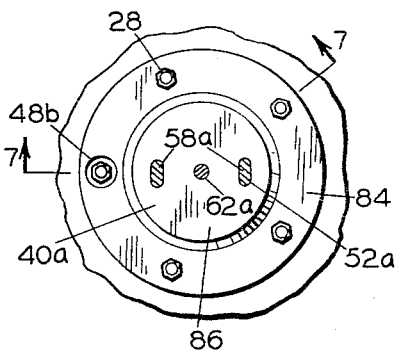
FIG. 8
FIG. 10
FIG. 14
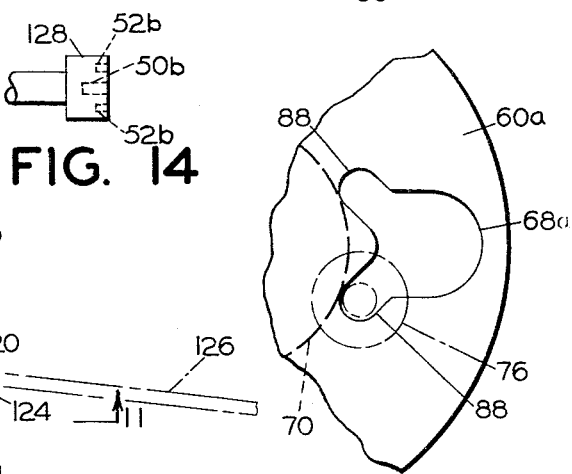
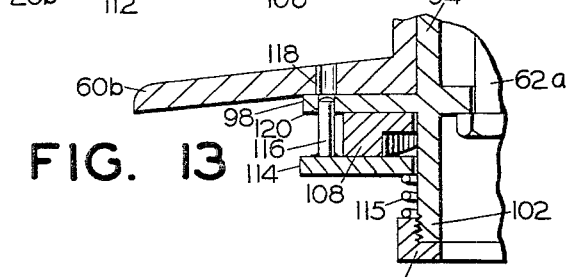
FIG. 13
FIG. 9
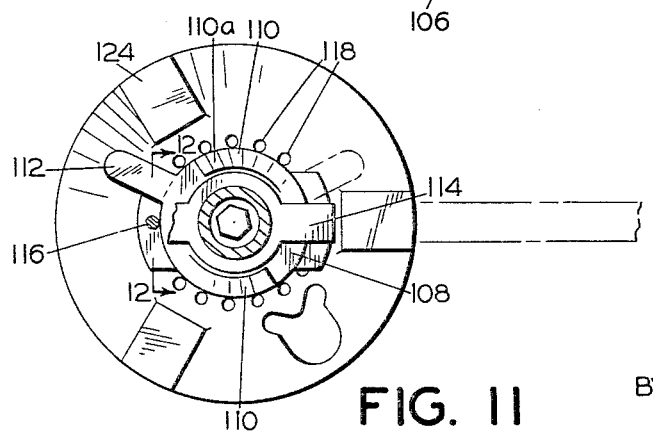
FIG. 11
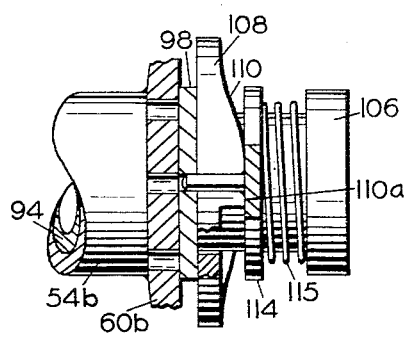
FIG. 12
INVENTOR.
JACK L. McCAIN
BY Eugene M. Eckelman
ATTORNEY

United States Patent Office 3,292,905
Patented Dec. 20, 1966

3,292,905
VEHICLE REMOVAL MEANS
Jack L. McCain, 2160 River View St.,
Eugene, Oreg. 97403
Filed Oct. 22, 1965, Ser. No. 507,620
2 Claims. (Cl. 254—166)

This is a continuation-in-part of application Serial No. 282,058, filed May 21, 1963, for Vehicle Removal Means, and now abandoned.

This invention relates to a vehicle removal means and relates more particularly to a means designed to facilitate removal of a vehicle from a ditch, rut or other such locations wherein it is stuck.

As conducive to a better understanding of the instant invention it should be understood that very often a wheel or wheels of a conventional motor vehicle such as an automobile, truck, or the like, may slip into a depression or other imperfection in the ground or road wherein it cannot develop the necessary traction for removal. It is frequently necessary in such circumstances to secure a portion of the vehicle to another, separately powered, means such as a tow truck or the like in order to withdraw the same from its predicament. However, such other separately powered means are not always readily available. An excessive amount of time and expense may be necessary for such an operation.

It is therefore a primary object of the instant invention to provide a means for removing a vehicle from a stuck position which utilizes the inherent powers supplied by the vehicle motor itself.

Another object of this invention is to provide a vehicle removal means whereby a cable means or the like may have one of its ends secured to a stationary object such as a tree, fence post, or the like, while its other end is secured to a drum means fixed to one of the driving wheels of the vehicle and wound thereupon to withdraw the vehicle from a ditch or rut.

A further object of the instant invention is to provide a means of the type described wherein either a plurality of vehicle removal devices may be secured to opposite ends of the conventional axle supporting means of a two or four wheel drive vehicle or a single vehicle removal device may be secured to one end of an axle supporting means of a vehicle including a no-slip differential.

A still further object of this invention is to provide a means which may be readily attached and removed from the vehicle without the necessity of tools which would not be readily available to the operator.

Yet another object of the instant invention is the provision of a device of the type described wherein at least a portion of the same may be semi-permanently secured to the vehicle so that only a single bolt means is necessary to render the device operative.

Other and further objects reside in the combination of elements, arrangement of parts, and features of construction. Still other objects will in part be obvious and in part be pointed out as the description of the invention proceeds and as shown in the accompanying drawing wherein:

FIGURE 1 is a schematic top plan view of a vehicle incorporating a first form of removal means of the instant invention, with parts broken away for illustrative clarity, and with the arrangement of additional devices and certain hidden parts being shown in dotted lines to illustrate the utilization of the instant inventive concept with a vehicle having front wheel drive or with a vehicle lacking no-spin differential;

FIGURE 2 is an enlarged vertical sectional view taken substantially on line 2—2 of FIGURE 1 and showing one wheel of the vehicle stuck in a ditch or rut in the ground;

FIGURE 3 is a fragmentary transverse cross-sectional view to an enlarged scale taken substantially on line 3—3 of FIGURE 2;

FIGURE 4 is a vertical sectional view to a still larger scale taken substantially on line 4—4 of FIGURE 3;

FIGURE 5 is a vertical sectional view to a scale similar to FIGURE 4 taken substantially on line 5—5 of FIGURE 3;

FIGURE 6 is a fragmentary detail sectional view taken substantially on line 6—6 of FIGURE 4;

FIGURE 7 is a fragmentary transverse cross sectional view showing a second form of the invention taken on the offset line 7—7 of FIGURE 8;

FIGURE 8 is a vertical sectional view taken on the line 8—8 of FIGURE 7;

FIGURE 9 is an enlarged, fragmentary elevational view taken on the line 9—9 of FIGURE 7;

FIGURE 10 is a fragmentary, transverse sectional view taken similar to FIGURE 7 but showing still another form of the invention;

FIGURE 11 is a vertical sectional view taken on the line 11—11 of FIGURE 10;

FIGURE 12 is an enlarged, fragmentary sectional view taken on the line 12—12 of FIGURE 11;

FIGURE 13 is an enlarged fragmentary sectional view taken similarly to FIGURE 10; and FIGURE 14 is a fragmentary elevational view showing a wheel hub utilized on certain vehicles and showing a manner of adapting such hub for use with elements of the present invention.

Like reference characters refer to like parts throughout the several views of the drawing.

Referring now to the drawings, a conventional vehicle is indicated generally in FIGURE 1 by the reference numeral 10 and has a front end 12, rear end 14, a pair of front wheels 16 secured to a front axle supporting means 18, a pair of rear wheels 20, a rear axle supporting means 22, and conventional differential means 24. A vehicle removal device forming part of the vehicle removal means of the instant invention is indicated generally by the reference numeral 26 and is shown as attached to one of the rear wheels 20 in the manner in which it would be utilized with a conventional rear drive vehicle having a no-slip differential.

Each of the wheels 16 and 20 is conventionally secured to the axle supporting means 18 and 22, respectively, by a plurality of radially spaced bolts such as shown at 28, five hexagonally headed bolts being indicated as illustrative. The bolts 28 may either have a tapered head such as shown at 30 in FIGURE 6 or may be flat headed, the wheel cover 32 and wheel support plate 34 being designed to accommodate a particular type of bolt.

The vehicle removal device 26 is basically formed of two elements an attaching member 36 and a drum 38. The attaching member 36 includes a base or hub portion 40 preferably having a tapered or bevelled surface 42 and a plurality of radially extending attaching means 44 including strengthening flanges 46 and openings 48 aligned with the bolts 28 and adapted to accommodate the same. The hub portion 40 further includes means defining a substantially central tapped bore 50 and at least one recess 52 radially spaced from the bore for a purpose to be described further hereinafter.

The drum 38 includes an elongated hollow shaft portion 54 having one end 56 engageable over the bore 50 and formed with a detent or projection 58 engageable in each of the recesses 52. The other end of the hollow shaft portion 54 has an angularly offset peripheral flange member 60 which, in combination with the bevelled surface 42 on the hub portion 40 of the attaching plate 36 and the outer surface of the elongated hollow shaft portion 54, defines a drum. A bolt 62 is insertable through the hollow shaft portion 54 and has a threaded end portion 64 engageable in the bore 50 and a head portion 66 formed substantially identical to the head portions of the bolts 28 so that it may be tightened and loosened by the same tool utilized for removing the wheels to fix a flat or the like.

An aperture 68 is defined in the peripheral flange 60 to receive a cable 70 which may be secured therein in any conventional manner.

The use and operation of the means of the instant invention will now be apparent. Whenever a driving wheel such as 20 in FIGURE 2 is stuck in a ditch or rut 72 in the ground 74 or is supported on a relatively unstable surface such as sand, mud, or the like, the operator of the vehicle may readily remove the hub cap (not shown) and sufficient of the bolts 28 removed to allow the attaching plate 36 to be secured in operative relationship to the axle supporting means 22 in an obvious manner. The drum 38 may then be secured to the attaching plate 36 by engagement of the bolt 62 through the hollow shaft portion 54 and into the tapped bore 50. The cable 70, secured in the aperture 68, is then attached in any conventional manner at its opposite end to a fixed structure (not shown) such as a tree, fence post, or other convenient similar means. On operation of the vehicle motor to rotate the axle supporting means 22 in the conventional manner, the vehicle removal means 26 will rotate to wind the cable 70 on the drum 38 to pull the vehicle 10 toward the hereinabove mentioned fixed structure.

In the event that the vehicle 10 is not provided with a no-slip differential it will be necessary to attach an additional vehicle removal device 76 to the opposite end of the axle supporting means 22. Also, if four wheel or front wheel drive is included in the vehicle 10, a vehicle removal device 78, or vehicle removal devices 78 and 80 may be attached to the axle supporting means 18 of the front wheels 16, depending upon whether or not a no-slip differential is present on the vehicle. It will be readily seen that the cable means of the vehicle removal devices may be extended either forwardly or rearwardly of the vehicle 10 to be secured to a fixed structure and that any type of cable means such as a rope, wire cable, or chain may be utilized.

It is also to be understood that the attaching plate 36 of each vehicle removal device in accordance with the instant inventive concept is relatively flat and may readily be accommodated beneath the conventional hub cap if desired so that this portion of the device may be permanently attached to the vehicle, only the drum 38 and the associated cable 70 being stored in the trunk or the like.

FIGURES 7, 8 and 9 show a second form of the invention. In this embodiment the vehicle removal means 26a similarly comprises a wheel attaching member 36a and a separable drum member 38a but the member 36a has a hollow hub portion 40a which is adapted to receive a hub 82 of the vehicle wheel assembly. Attaching member 36a has a peripheral flange 84 provided with a plurality of openings 48a for receiving the wheel mounting bolts 28 whereby the attaching member 36a is adapted to be secured to a wheel cover 32a. Flange 84 and its openings 48a are dimensioned and arranged for adaptation to all types of wheel structures. As viewed in FIGURES 7 and 8, one of the apertures 48a is enlarged, and more particularly is sufficiently enlarged to freely receive the head of a wheel bolt 28. By means of this one enlarged aperture, the attaching member 36a can be mounted on the wheel by removing all of the bolts 28 except one and then reinserting the bolts to secure said attaching member in place. It is thus apparent that the one mounting bolt 28 which is received in the enlarged aperture will hold the wheel in place while mounting the attaching member thereon.

One feature of the FIGURE 7 embodiment is that the hub receiving portion 40a is sufficiently enlarged to receive the hub 82 of the wheel, and furthermore is sufficiently flat to be accommodated beneath a conventional hub cap if desired so that it may be permanently attached to the vehicle and the drum 38a installed and removed as needed.

Drum 38a has a hollow shaft or winding portion 54a and is adapted to engage a flat outer end 86 of hub receiving portion 40a. Mounting attachment of the drum on the portion 40a is accomplished by a bolt 62a which extends axially through the drum and threadedly engages a tapped bore 50a in the hub 40a. As in FIGURE 1, a non-rotative connection of the drum with the portion 40a is accomplished by engagement of one or more detents or projections 58a on the end of the drum with apertures 52a in the end 86 of the portion 40a. In a preferred construction, the detents 58a are tapered inwardly toward their outer ends for a purpose to be described, the apertures 52a being correspondingly tapered.

Drum 38a has end flanges 60a for confining wrapped portions of cable on the drum. The outer flange 60a has an aperture 68a which extends radially in the flange and has a pair of inwardly leading, angular extensions 88. Aperture 68a is sufficiently enlarged to receive a ferrule 90 on the end of the cable 70 whereby said ferrule may be inserted through said aperture and locked behind the reduced size aperture extensions 88. The oppositely projecting extensions 88 are acutely angled with relation to each other and provide for attachment of the cable to the drum and winding thereon in either direction of rotation.

FIGURE 10 through 13 show another form 26b of the present vehicle removal means and employs a feature wherein a drum 38b is associated with structure which is capable either of locking the drum to the wheel for driving operation by the wheel or to provide free wheeling of the drum relative to the wheel. As in FIGURE 7, there is employed an attaching member 36a arranged to be mounted on the wheel in a permanent connection if desired. In this embodiment and for accomplishing the intended purpose, drum 38b has a hollow shaft portion 54b in which is journaled a spindle or shaft 94 having flanged ends 96 and 98 on opposite ends. The outer end of spindle 94 has a hollow extension 100 provided with a threaded end portion 102 which receives a cap 104 having a central opening 106.

Rotatably mounted on the hollow extension 100 is a cam lever 108 which comprises essentially a flat plate having a pair of diametrically opposed, arcuate, tapered portions 110 which form cams, these tapered portions being on the outwardly facing side of the lever 108. As stated hereinbefore, the tapered portions 110 are diametrically opposed, and as seen in FIGURE 11 each extends approximately 90 degrees around the lever 108. Lever 108 has a projecting lug 112 by means of which said lever may be manually rotated to selected positions.

Also rotatably mounted on the hollow extension 100 is a latch arm 114 urged forcibly into engagement with the lever 108 by a compression spring 115 mounted around the hollow extension 100 and confined between the arm 114 and the cap 104.

Integrated with the inwardly directed surface of latch arm 114 is a pair of positioning pins 116 arranged for engagement in selected ones of a plurality of diametrically opposed apertures 118 provided in the outer drum flange 60b. Pins 116 project past the outer edge of lever 108 and extend through a pair of apertures 120 in the spindle flange 98 for engagement with the apertures 118 in the drum flange 60b.

Thus, in the assembly described, the latch arm 114 and the lever 108 are urged forcibly into engagement with the spindle flange 98, and when the lever 108 is positioned such that the latch arm 114 engages the flat plate portions of said lever, namely a position out of engagement with the cams 110, the latch arm 114 is disposed in an innermost position wherein pins 116 engage a selected pair of apertures 118. In this position of the pins the drum has integral rotation with the spindle 94 and a drive connection is established between the vehicle wheel and the drum, the spindle being connected to the attaching member 36a by a bolt 62a which extends through an inner wall 122 in the spindle and threadedly engages a tapped bore 50a in the hub receiving portion 40a and by engaging detents 58a and apertures 52a.

When it is desired that the drum have free wheeling, the lever 108 is turned manually approximately 90 degrees from that shown in FIGURE 11 whereby the tapered cam portions 110 ride against the inwardly directed surface of latch arm 114 and urge the latter toward the outer end of the extension 100. Such outward movement of the latch arm 114 causes the pins 116 to disengage from the apertures 118 to provide for the free wheeling operation of the drum. It is thus clear that the thickness of the cam portions 110 on the lever 108 must be sufficient to cause the necessary outward movement of latch arm 114 for disengagement of pins 116 from the apertures 118. The outwardly or free wheeling position of the latch arm 114 is shown in FIGURES 12 and 13.

In order that the lever 108 will remain in a position providing for free wheeling of the parts, the tapered cam portions 110 have a flat area 110a on their thickest portions to provide a flat, non-tapering engagement with the latch arm 114.

The outer surface of the outer drum flange 60b is provided with two or more outwardly opening radially directed socket members 124 for manual rotation by a lever 126 arranged for end engagement in the sockets 124. Thus, if desired, hand operation of the drum may be accomplished.

FIGURE 14 illustrates a hub 128 which exists on some vehicles. For the purpose of attaching the drum portion of the present invention to such a structure, the hub 128 is modified whereby to have a pair of end recesses 52b adapted to receive the detents 58 of FIGURE 3 or the detents 58a of FIGURES 7 and 10. The hub is further modified in that it is provided with a central tapped bore 50b for engagement by the bolt 62 of FIGURE 3 or the bolts 62a of FIGURES 7 and 10. It is thus apparent that by modifying the hub 128 as described the drum portion of the present invention may be installed thereon.

It will now be seen that there is provided an improved vehicle removal means which satisfies all of the objects of the instant invention and others, including many advantages of great practical utility and commercial importance. The device of all the embodiments is readily attached and detached merely by suitable removal and reinsertion of the wheel bolts 28, or if the drum portion only is to be removed then it is only necessary to remove the bolt 62 of FIGURE 3 or the bolts 62a of FIGURES 7 and 10. As stated in connection with FIGURES 7 and 10, the detents 58a and their receiving apertures 52a are tapered which facilitates easy insertion and removal of said detents in their apertures.

Since many embodiments may be made of the instant inventive concept and since many modifications may be made of the embodiments hereinbefore shown and described, it is to be understood that all matter herein is to be interpreted merely as illustrative and not in a limiting sense.

I claim:
1. Vehicle removal means for use with a vehicle having at least one driving wheel secured to an axle supporting means by a plurality of wheel bolts, comprising a drum having end flanges for confining wrapped portions of a cable thereon, an attaching member having lateral flange means arranged for receiving the wheel bolts to mount said attaching member on the driving wheel, a spindle releasably mounted on said attaching member and rotatably supporting said drum, a latch member mounted non-rotatably on said spindle but having axial slidable movement thereon, drive pin means integrated with said latch member and projecting toward said drum, means in said drum defining a plurality of apertures arranged normally for engagement by said drive pin means for establishing a driving connection between said drum and said spindle, and rotatable cam means mounted on said spindle and engageable with said latch member, said cam means being arranged to slidably move said latch member on said spindle to a position to disengage said drive pin means from said apertures to provide free rolling of said drum on said spindle.

2. Vehicle removal means for use with a vehicle having at least one driving wheel secured to an axle supporting means by a plurality of wheel bolts, comprising a drum having end flanges for confining wrapped portions of the cable thereon, an attaching member arranged for mounting on the driving wheel, a spindle releasably mounted on said attaching member and rotatably supporting said drum, a latch member mounted non-rotatably on said spindle but having axial slidable movement thereon, drive pin means integrated with said latch member and projecting toward said drum, means in said drum defining a plurality of apertures arranged normally for engagement by said drive pin means for establishing a driving connection between said drum and said spindle, and rotatable cam means mounted on said spindle and engageable with said latch member, said cam means being arranged to slidably move said latch member on said spindle to a position to disengage said drive pin means from said apertures to provide free rolling of said drum on said spindle.

References Cited by the Examiner

UNITED STATES PATENTS

| 1,325,658 | 12/1919 | Rousseau | 242—95 |
|---|---|---|---|
| 1,837,583 | 12/1931 | Powers | 242—95 |
| 2,683,584 | 7/1954 | Lelberg. | |
| 3,099,416 | 7/1963 | Wright | 242—95 |

FOREIGN PATENTS 344,908  2/1960  Switzerland.

MARVIN A. CHAMPION, *Primary Examiner.*

EVON C. BLUNK, *Examiner.*

H. C. HORNSBY, *Assistant Examiner.*